(12) United States Patent
Konda

(10) Patent No.: US 8,803,991 B2
(45) Date of Patent: Aug. 12, 2014

(54) SNAPSHOT CAPTURE IN VIDEO STREAM

(75) Inventor: Praveen Konda, Jacksonville, FL (US)

(73) Assignee: Cisco Technology, Inc., San Jose, CA (US)

( * ) Notice: Subject to any disclaimer, the term of this patent is extended or adjusted under 35 U.S.C. 154(b) by 330 days.

(21) Appl. No.: 13/271,891

(22) Filed: Oct. 12, 2011

(65) Prior Publication Data

US 2013/0093832 A1 Apr. 18, 2013

(51) Int. Cl.
*H04N 5/225* (2006.01)
(52) U.S. Cl.
USPC .................................. 348/220.1; 348/231.2

(58) Field of Classification Search
USPC .......................... 709/203; 348/14.08; 715/754
See application file for complete search history.

(56) References Cited

U.S. PATENT DOCUMENTS 7,634,533 B2 * 12/2009 Rudolph et al. ............... 709/203
2012/0278738 A1 * 11/2012 Kruse et al. .................... 715/754

* cited by examiner

*Primary Examiner* — Mohammad Islam
(74) *Attorney, Agent, or Firm* — Merchant & Gould

(57) ABSTRACT

In video conference scenarios, participants may be interested in preserving particular video frames. The participants may wish to capture one or more individual frames for storage and later usage. Systems and methods are described herein for a presenter to tag individual pictures during a live video stream for remote user download.

19 Claims, 5 Drawing Sheets

SNAPSHOT CAPTURE IN VIDEO STREAM

BACKGROUND

In video conference scenarios, participants may be interested in preserving particular video frames. The participants may wish to capture one or more individual frames for storage and later usage. Embodiments described herein present systems and methods for a presenter to tag individual pictures during a live video stream for remote user download.

BRIEF DESCRIPTION OF THE DRAWINGS

The accompanying drawings, which are incorporated in and constitute a part of this disclosure, illustrate various embodiments. In the drawings.

DESCRIPTION OF EXAMPLE EMBODIMENTS

Overview

Figure 1:
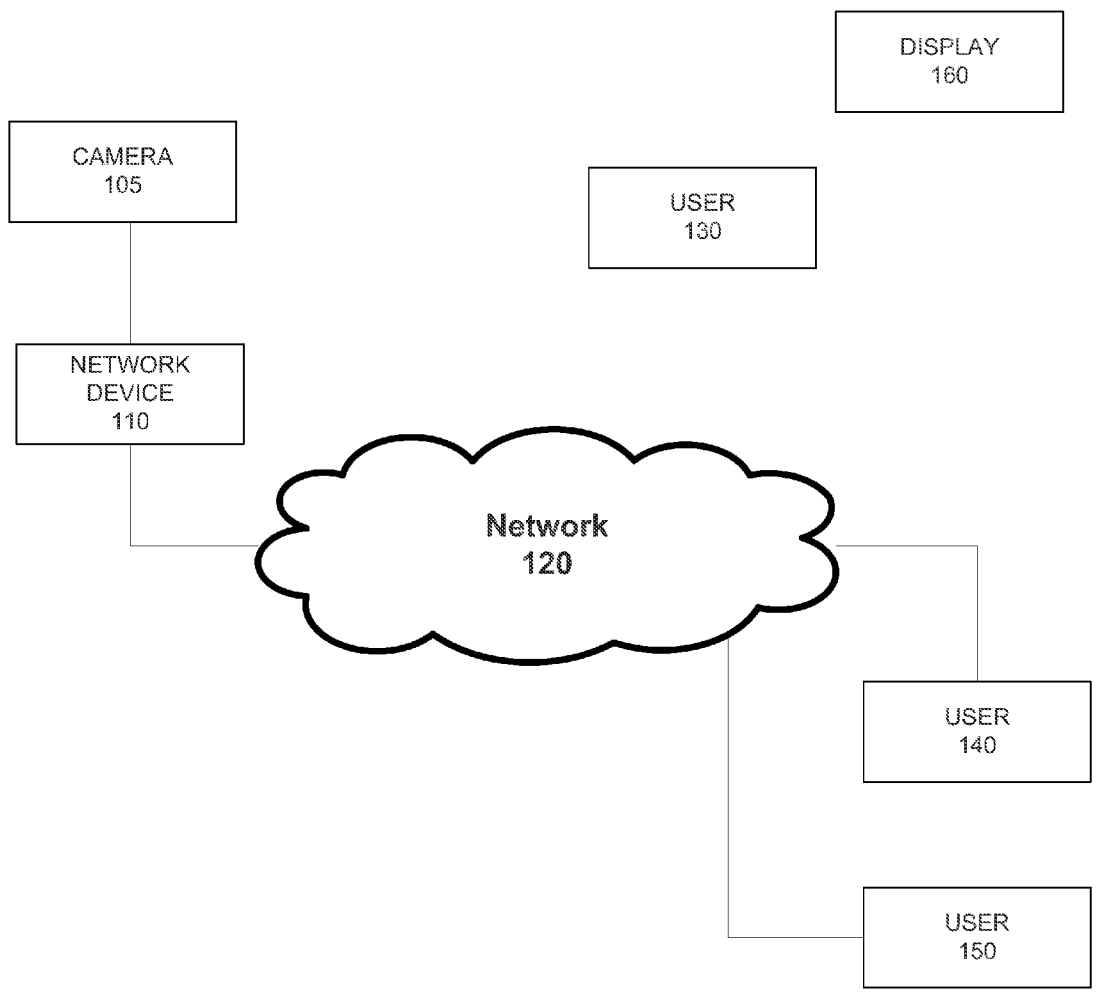
FIG. 1 is a block diagram of an operating environment for embodiments described herein.

Consistent with embodiments of the present disclosure, systems and methods are disclosed for providing a presenter of a video conference to tag particular frames (or range of video frames) as still pictures. The tagged still pictures may be made available for a plurality of participants in the video conference for remote display and storage.

It is to be understood that both the foregoing general description and the following detailed description are examples and explanatory only, and should not be considered to restrict the application's scope, as described and claimed. Further, features and/or variations may be provided in addition to those set forth herein. For example, embodiments of the present disclosure may be directed to various feature combinations and sub-combinations described in the detailed description.

DETAILED DESCRIPTION

The following detailed description refers to the accompanying drawings. Wherever possible, the same reference numbers are used in the drawings and the following description to refer to the same or similar elements. While embodiments of this disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

In the context of a voice call it is possible to send DTMF tones in band as part of the voice call. Similarly, a presenter of a video conference presentation can capture and tag an individual frame of the active video stream and provide the captured frame to participants in the video conference presentation using in band capabilities.

FIG. 1 is a block diagram illustrating an operating environment for providing snapshot capture in a live video stream. A video camera 105 may be provided to capture a live video stream. Video camera 105 may be any video capture device capable of capturing and storing live video. In some embodiments, video camera 105 may be capable of capturing video in varying formats including among others, SD video, HD video, MPEG video, 3D video, and other video formats suitable for transmission in a video conference setting. Video camera 105 may be located at the source location where a presenter is capturing video intended to be streamed to one or more remote viewers. For example, a presenter may capture a slide show presentation displayed on a screen at the source location. The remote users may comprise any number of users interested in the content of the video stream.

Video camera 105 may be in communication with a network device 110. Network device 110 may facilitate the transmission of the video conference video stream to a plurality of interested users. In should be understood in some embodiments, video camera 105 may be integrated into network device 110. Network device 110 may indeed be a device that has integrated video capture capabilities and network communication capabilities. Network device 110 may process the video stream for transport to the remote users for presentation.

Network device 110 may communicate with remote users, such as user 130, user 140, and user 150 via a network 120, such as an IP network (e.g. the Internet). It should be understood that network 120 may include any communications medium that allows the transmittal of a video stream to a plurality of remote (or local intranet) users. Network device 110 may further comprise a processor for controlling operations of network device 110. Further capabilities and structures of network device 110 are described in further detail below in the discussion of FIG. 5.

The live video stream may be communicated to a plurality of interested users. Interested users may receive the video stream on any number of devices that are configured to be capable of receiving a video stream. Many of these devices may have built in capabilities to decode an encoded video stream and subsequently display the video stream on a display. In some embodiments the display may be integrated into the user's device, while in other embodiments the user's device may decode the video stream and transmit the decoded video stream on a separate display device.

For example, a user operating user device 130 may receive an encoded live video stream from network device 110 over network 120. User device 130 may be a personal computer with an associated display device 160. User device 130 may decode the encoded live video stream using an integrated decoder and subsequently provide the decoded video stream on associated display device 160, such as a monitor or any other suitable display device. As such, the user at device 130 may be a participant in a live video conference originated by a presenter at network device 110.

Similarly, other users may take advantage of different devices to participate in a video conference presentation. For example, a user may participate in a video conference on a dedicated video conferencing device 140. Dedicated video conferencing device 140 may be a fully integrated device capable of decoding and displaying a live video conference. Dedicated video conferencing device 140 may typically have associated video and audio inputs such that the user can be fully participatory in the video conference.

Another user, for example, may be participating in a video conference via a mobile device 150. Mobile device 150 may be one of any number of portable devices including, for example, a cellular phone that has very limited videoconference resources. Mobile device 150 may only be capable of receiving and displaying a low-bandwidth video stream. In some embodiments, mobile device 150 may only have an audio feed of the audio associated with the video conference. In such an environment, the user of mobile device 150 may need alternate methods to obtain video frames of interest as tagged by a presenter. Methods 300 and 400 as described below illustrate ways in which users of the above described devices and other devices capable of participating in a video conference setting.

Figure 2:
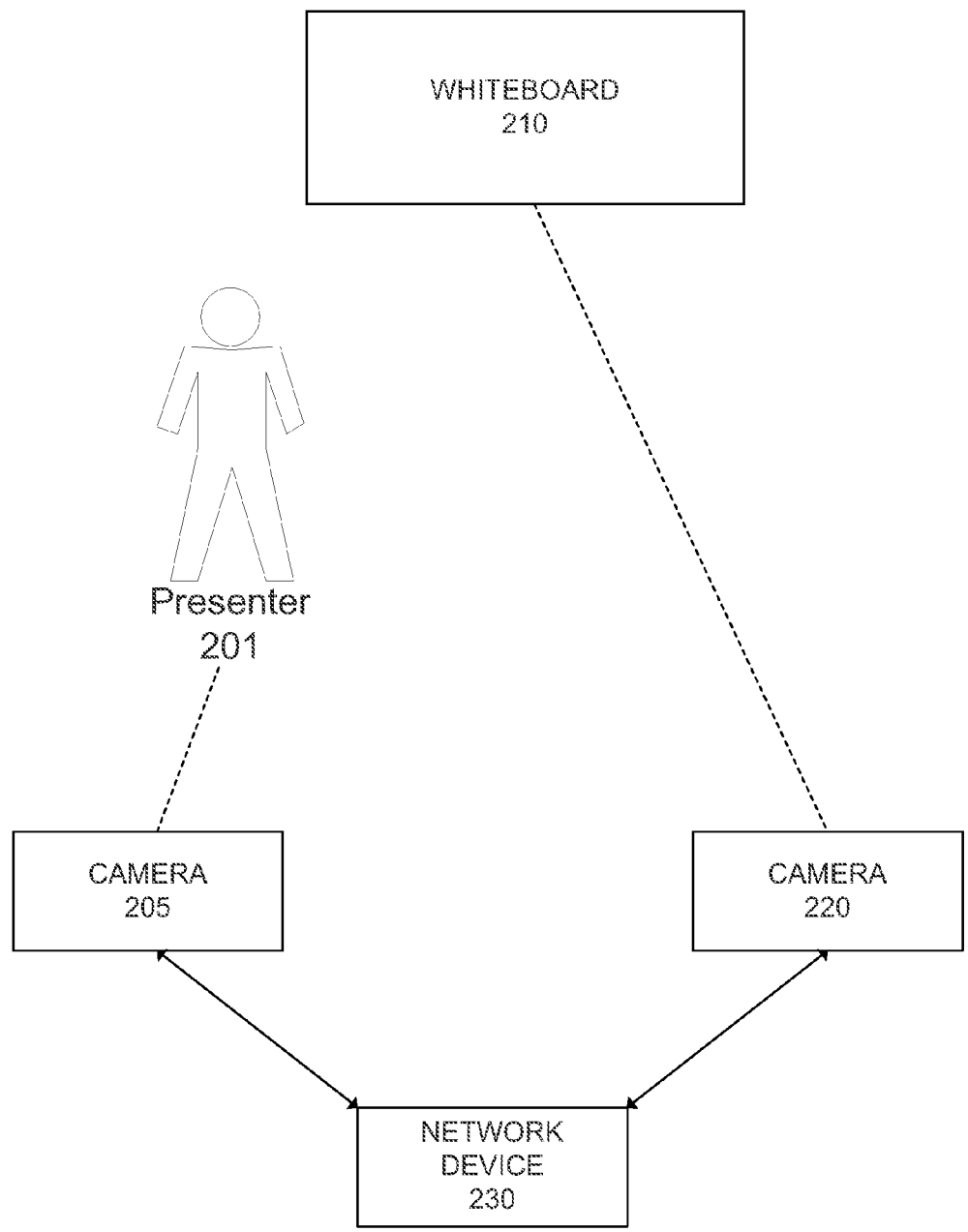
FIG. 2 is a block diagram of an operating environment for embodiments described herein.

FIG. 2 describes other operating environments for embodiments described herein. Many presenters providing live video streams may take advantage of a multiple camera setup. This may provide varying angles of view to the subject material and also provide different sources of content to include in the live video. For example, a presenter 201 may be a professor in an educational setting. As such, presenter 201 may be both presenting course material to a classroom of local students as well as a plurality of students receiving the presentation over a live video stream at one or more remote locations. Remote students for example may comprise the plurality of remote users as described with respect to FIG. 1.

Presenter 201 may take advantage of the use of a whiteboard 210 for the presentation of material intended for students. Whiteboard 210 may a used such that presenter 201 can add notes fluidly with the presentation of the course material. The added material may be intended for viewing by both local and remote viewers. In some embodiments, whiteboard 210 may be a screen upon which presenter 201 displays slides from a slideshow relevant to the presentation. It should be understood that whiteboard 210 may be any display capable of aiding presenter 201 with the presentation.

To better capture the totality of the presentation, two cameras may be employed at the presentation location. In the present example, a camera 205 may be employed to follow presenter 201 during the presentation. Camera 205 may be set to one position or may be operated manually or automatically to follow presenter 201 as presenter 201 moves around during the presentation. This may provide an accurate video and audio feed of presenter 201's actions and vocals.

To further enhance the presentation, a second camera may be employed. For example, a camera 220 may be focused on whiteboard 210 such that all information written or otherwise displayed on whiteboard 210 may be captured for view for remote users viewing the presentation as a live video stream. To wit, in some embodiments, camera 220 may be a still camera that simply captures images of interest that are displayed on whiteboard 210.

In some embodiments, presenter 201 may have the capability of tagging images from either or both of camera 205 and camera 220. For example, presenter 201 may tag an image of whiteboard 210 using camera 220 where whiteboard 210 is displaying a still image representative of a single slide within a slideshow. This tagged image may subsequently be made available as in-band data to the remote users through network device 230.

Figure 3:
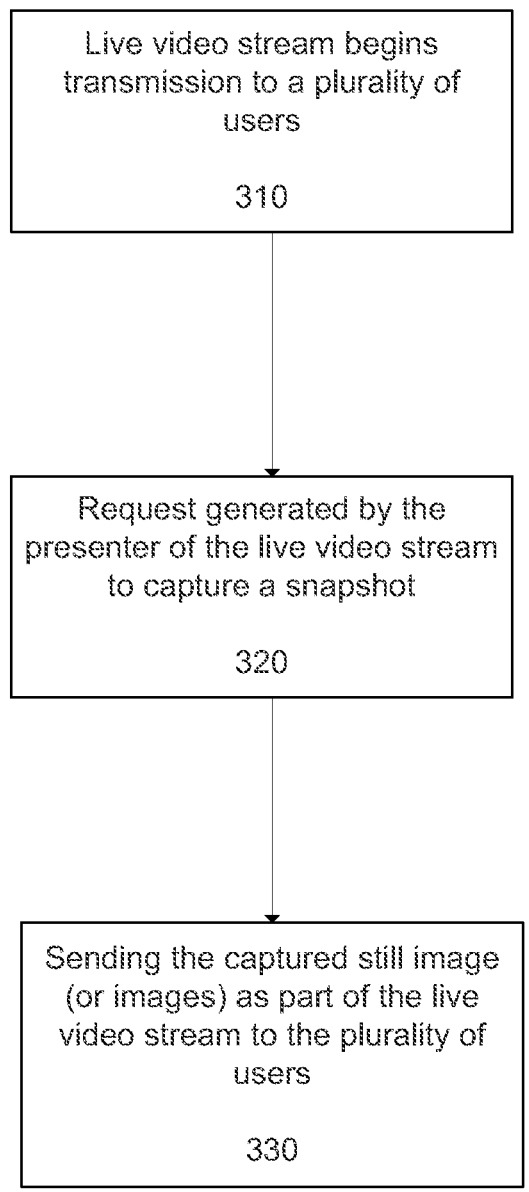
FIG. 3 is a flow chart of embodiments for providing a snapshot capture in a video stream.

FIG. 3 is a flow chart illustrating embodiments of image snapshot capture and distribution. Method 300 may begin at step 310 where a live video stream begins transmission to a plurality of users. The users may be remote from the source of the live video stream. The live video stream may be a presentation made from a presenter to the remote users as captured by one or more cameras and encoded for network transmission through a network device.

Method 300 may then proceed to step 320 wherein a request may be generated by the presenter of the live video stream to capture a snapshot comprising a still image from the live video stream. This still image may be captured from any one of the camera used to produce the live video stream, or alternatively from a still camera which is purposed for such image capture. In some embodiments, the presenter may request to capture a subset of still images from the presentation.

Once a request has been made to capture one or more images, method 300 may proceed to step 330. Step 330 may comprise sending the captured still image (or images) as part of the live video stream to the plurality of users. This step may be accomplished by including the still image as part of the in-band data being transmitted with the live video stream.

In some embodiments the presenter may predetermine the file type of the captured images. For example, a captured picture may be stored in a jpeg file format. In some embodiments, a remote user may desire to receive captured images in a file format different than that predetermined by the presenter. It is contemplated that the remote user may submit file format request information to the presentation system or may have profile information that indicates a desired file format. The system may then make versions of the captured images available for download in the file format desired by the remote user.

As part of step 330 a tag may be appended to mark the still image in such a way that the tag indicates the availability of the still image to the plurality of remote users viewing the presentation. The tag may serve as an indicator that the live video stream contains still images requested by the presenter to be made available for download and viewing by the remote users. In some embodiments, the tagged images will be automatically attached to a meeting summary file associated with the live video stream.

In some embodiments the transmission of captured images to remote viewer may further comprise negotiating an RTP payload during the setup phase of the live video stream connection. This negotiation may include allotting in band space for transmitting the one or more still images.

Figure 4:
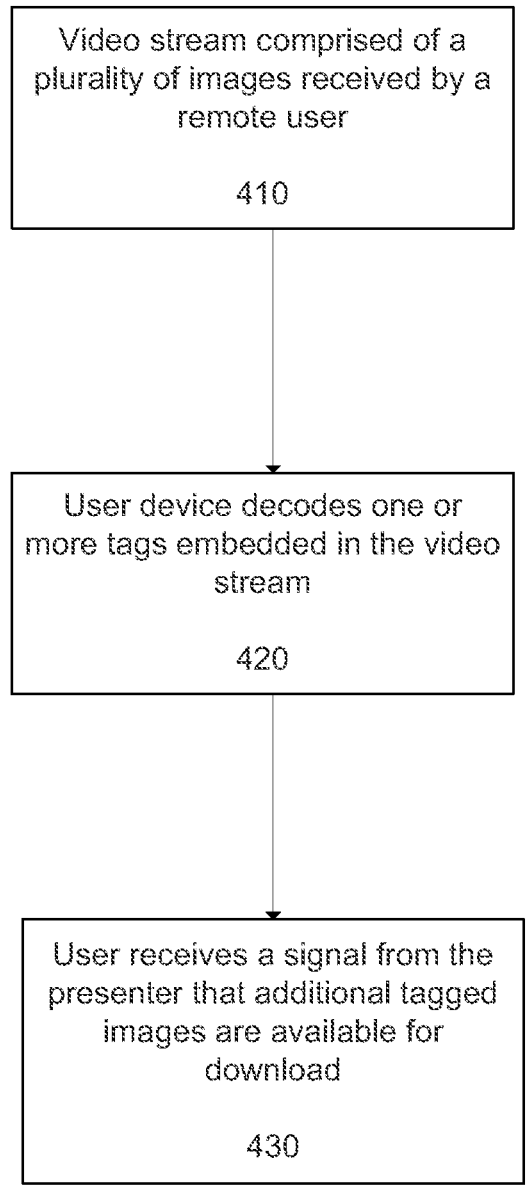
FIG. 4 is a flow chart of embodiments for providing a snapshot capture in a video stream.

FIG. 4 is flow chart illustrating embodiments of image snapshot capture and distribution from the perspective of a remote user. Method 400 may begin at step 410 where a video stream comprised of a plurality of images may be received by a remote user. The remote user may be viewing the live video stream over any device capable of displaying such video. As described in respect to FIG. 1, this may include devices from full-service computing devices to limited video capability devices such as cellular or digital phone handsets. Furthermore, the remote user may be at a stationary location, such as their home or office. In some embodiments, the remote user may by a mobile user that is moving between one or more mobile networks accessing the video stream.

Method 400 may then proceed to step 420. At step 420 the user device may decode one or more tags embedded in the video stream. The decoded tags may identify individual images of the plurality of images in the live video stream that have been selected by a presenter of the video stream as images of interest. In some embodiments, the tags may be associated with I-frames within the video stream. Furthermore, the tags may be received as in-band data. In some embodiments, at least one tag is associated with a range of individual images.

Method 400 may then proceed to step 430. At step 430 the user may receive a signal from the presenter that additional tagged images are available for download. The user may then download the additional tagged images at their leisure.

Figure 5:
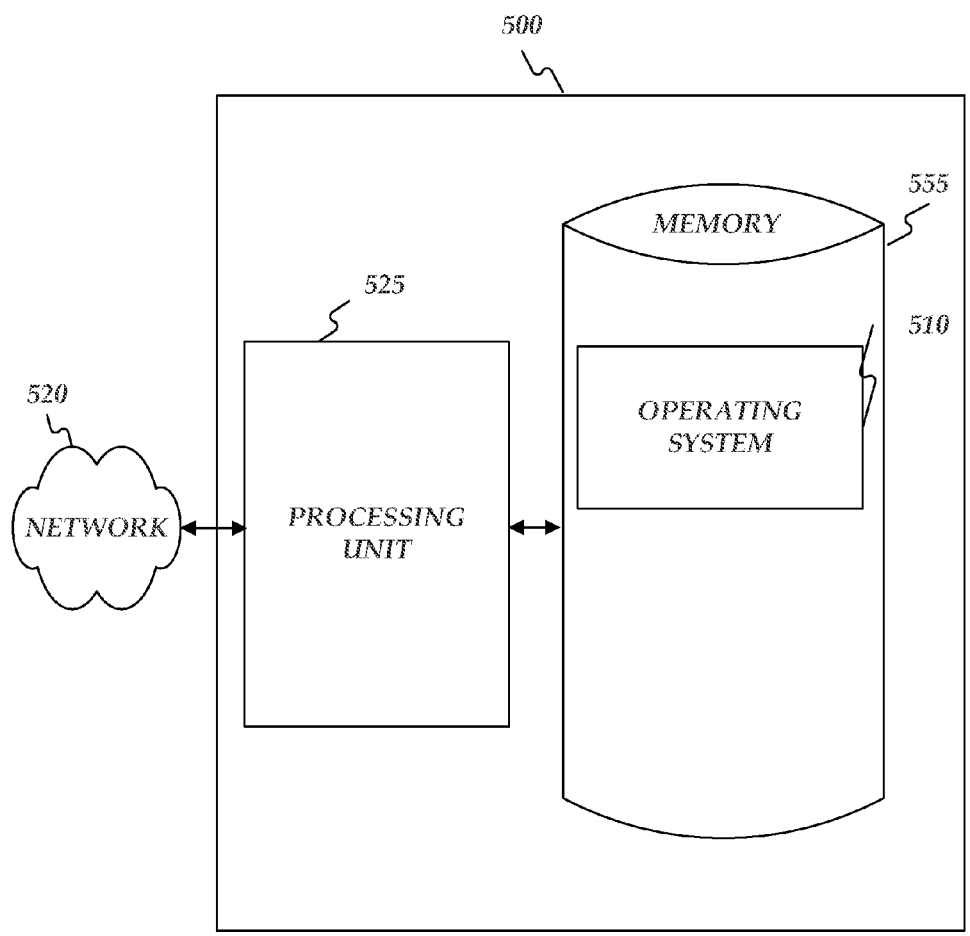
FIG. 5 is a block diagram of a network computing device.

FIG. 5 illustrates a network device such as computing device 500. Computing device 500 may include processing unit 525 and memory 555. Memory 555 may include software configured to execute application modules such as an operating system 510 and/or a program guide interface 520. Computing device 500 may execute, for example, one or more stages included in methods 300 and 400 as described above with respect to FIGS. 3 and 4 respectively. Moreover, any one or more of the stages included in methods 300 and 400 may be performed on any element shown in FIG. 5.

Computing device 500 may be implemented using a personal computer, a network computer, a mainframe, a computing appliance, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Embodiments of the present disclosure, for example, are described above with reference to block diagrams and/or operational illustrations of methods, systems, and computer program products according to embodiments of this disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and are the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

What is claimed is:

1. A method comprising:
    sending a live video stream to a plurality of users;
    receiving a request from a presenter of the live video stream to capture a snapshot comprising a still image from the live video stream;
    tagging the still image wherein the tag indicates the availability of the still image to the plurality of users; and
    sending the still image as part of the live video stream to at least one of the plurality of users download in a file format desired by the at least one of the plurality of users.

2. The method of claim 1, further comprising automatically attaching the tagged image to a meeting summary file associated with the live video stream.

3. The method of claim 1, wherein the still image is captured in a first file format predetermined by the presenter.

4. The method of claim 3, wherein the still image is sent to one of more of the plurality of users in a second file format different than the first file format.

5. The method of claim 1, further comprising negotiating an RTP payload during setup of the live video stream connection, wherein the negotiation comprises allotting in band space for transmitting the still image.

6. The method of claim 1, further comprising: creating the live video stream from a first camera; and capturing the still image with a second camera different from the first camera.

7. A method comprising:
    receiving a video stream comprised of a plurality of images; and
    decoding one or more tags embedded in the video stream, wherein the tags identify individual images of the plurality of images that have been selected by a presenter of the video stream as images of interest wherein the tag indicates the availability of the individual images to a remote user in a file format desired by the remote user.

8. The method of claim 7, wherein the tags are associated with I-frames within the video stream.

9. The method of claim 7, wherein the tags are received as in-band data.

10. The method of claim 9, further comprising receiving a signal from the presenter that the tagged images are available for download.

11. The method of claim 7, wherein at least one tag is associated with a range of individual images.

12. An apparatus comprising:
    a first camera for capturing a video stream at a presenter location; and
    a processor configured to:
        receive input from the presenter;
        tag the active image in the video stream at the time that presented input is received;
        store the tagged image in a memory; and
        alert one or more remote viewers of the video stream that the stored image is available for download.

13. The apparatus of claim 12, wherein the processor is further configured to embed the stored image in the video stream.

14. The apparatus of claim 12, wherein the processor is further configured to store the tagged image as a jpeg file.

15. The apparatus of claim 12, further comprising a second camera, wherein the second camera is configured to capture still pictures.

16. The apparatus of claim 15, wherein the processor is further configured to: tag a still picture captured by the second camera; and alert one or more remote viewers of the video stream that the still image is available for download.

17. The apparatus of claim 16, wherein the processor is further configured to: store a plurality of still pictures captured and tagged by the second camera; automatically incorporate the stored pictures in a meeting summary file; and automatically distribute the meeting summary file upon the completion of the video stream.

18. The apparatus of claim 12, wherein the processor is further configured to transmit the tagged image to one or more remote viewers in direct response to the image being tagged.

19. The apparatus of claim 15, wherein the processor is further configured to transmit the stored image to a mobile phone device.

* * * * *